United States Patent [19]

Ohashi

[11] Patent Number: 5,455,818
[45] Date of Patent: Oct. 3, 1995

[54] OPTICAL RECORDING MEDIUM

[75] Inventor: Yumiko Ohashi, Hashima, Japan

[73] Assignee: Brother Kogyo Kabushiki Kaisha, Nagoya, Japan

[21] Appl. No.: 8,577

[22] Filed: Jan. 22, 1993

[30] Foreign Application Priority Data

| Jan. 22, 1992 | [JP] | Japan | 4-009307 |
| Jan. 22, 1992 | [JP] | Japan | 4-009308 |
| Jan. 22, 1992 | [JP] | Japan | 4-009309 |

[51] Int. Cl.⁶ .................................. G11B 3/70
[52] U.S. Cl. .............................. 369/284; 369/283
[58] Field of Search .......................... 369/284, 283, 369/275.1, 276, 277, 279, 286; 428/694, 900, 692; 360/77.08, 77.11, 77.04

[56] References Cited

U.S. PATENT DOCUMENTS

| 4,578,788 | 3/1986 | Ahn et al. | 369/284 |
| 4,586,173 | 4/1986 | Ando | 369/275 |
| 4,737,877 | 4/1988 | Krongelb et al. | 369/284 |
| 4,918,972 | 4/1990 | Kenny et al. | 360/77.04 |
| 5,089,358 | 2/1992 | Taki et al. | 369/283 |

*Primary Examiner*—John H. Wolff
*Assistant Examiner*—David L. Ometz
*Attorney, Agent, or Firm*—Oliff & Berridge

[57] ABSTRACT

An optical recording medium affording a maximum Kerr effect enhancement, yet exhibiting a good signal-to-noise ratio, includes, for example, a substrate, an interference layer, a tracking guide layer, and a recording layer which are successively formed one above the other in the stated order. The interference layer is made of a light transmissive material and has a refractive index that is larger than that of the substrate. The interference layer has a first portion etched to a predetermined depth (d) and a second portion having a predetermined thickness (D). The tracking guide layer is formed on the second portion of the interference layer in a predetermined pattern, e.g. spirally or coaxially, for obtaining a tracking signal for use in tracking servo. The thickness of the interference layer defined by D minus d is set substantially equal to $(\lambda/4n)+M(\lambda/2n)$ where $\lambda$ is a wavelength of light for reading the information, n is a refractive index of the interference layer, and M is an integer.

16 Claims, 3 Drawing Sheets

OPTICAL RECORDING MEDIUM

BACKGROUND OF THE INVENTION

1. Field of the Invention

The present invention relates to an optical recording medium such as optical disk memory and an optical card, information being writable thereon and readable therefrom with the irradiation of a laser.

2. Description of the Prior Art

As shown in FIG. 1, a conventional optical recording medium 30 is made up of a transparent substrate 32 typically made of an acrylic substance, polycarbonate or glass having a surface on which a tracking guide groove 31 is formed, an interference layer 34 made of SiAiON or AlN, a magneto-optic recording layer 37 made of GdTbFe or TbFeCo, a protective layer 38 made of SiAiON or AlN, and a reflection layer 40 made of Al. These layers are successively formed one above the other in the stated order. Recordation of information on such an optical recording medium is carried out by irradiating a laser onto the magneto-optic recording layer 37 and heating the layer 37 above a Curie temperature or a compensation temperature while simultaneously applying an external magnetic field thereto to thereby create inverse magnetization of the layer 37. Reproduction of the information from the recording medium is achieved by utilizing the Kerr effect in which the rotation of the plane of polarization of the reflection light is reversed depending on the magnetization direction when a laser of linear polarization is irradiated onto the recording layer 37. To obtain a good signal characteristic, it has been necessary to increase a virtual Kerr rotating angle with Kerr effect enhancement and to improve a signal-to-noise ratio. To this end, the interference layer 34, having a higher refractive index than the substrate 32, is interposed between the substrate 32 and the recording layer 37 to utilize an interference effect which results when there are multiple reflections of light.

In such a conventional optical recording medium, the thickness of the interference layer 34 is set substantially to $\lambda/4n$ in order to increase the Kerr effect enhancement resulting from the interference effect at the substrate, interference layer, recording layer, protective layer and the reflection layer, where $\lambda$ is a wavelength of a reproducing light and n is a refractive index of the interference layer 34. However, as can be appreciated from the curves depicted in FIG. 2, setting the thickness of the interference layer 34 to $\lambda/4n$ adversely reduces the reflection of light from the groove 31. Further the thickness of the recording layer 37 is set so that the reflection of light from the recording layer 37 is a minimum. Therefore, the push-pull signal used for tracking servo is substantially zeroed. Consequently, the tracking servo becomes unstable and thus stable reproduced output cannot be obtained. For the reasons stated above, it is impossible to attain the maximum Kerr effect enhancement and there is the problem that an allowable range of thickness of the interference layer is so limited and thus an allowable variation in the thickness of the layer is very small.

SUMMARY OF THE INVENTION

The present invention has been made to obviate the problems noted above, and accordingly it is an object of the invention to provide a high quality optical recording medium which can increase the Kerr effect enhancement and achieve a stable tracking capability.

To achieve the above and other objects, there is provided, according to one aspect of the invention, an optical recording medium which includes a substrate and an interference layer formed over the substrate. The interference layer is made of a light transmissive material and has a refractive index higher than that of the substrate for causing multiple reflections of light to occur to thereby yield an interference effect. The interference layer has a first portion etched into a predetermined depth (d) and a second portion having a predetermined thickness (D). A tracking guide layer is formed over the second portion of the interference layer in a predetermined pattern, e.g. spirally or coaxially, for obtaining a tracking signal for use in tracking servo. A recording layer is formed at least over the first portion of the interference layer for recording information therein.

In accordance with another aspect of the invention, there is provided an optical recording medium wherein for the multi-layer arrangement as described above, the recording layer and the tracking guide layer are interchanged. That is, the recording layer is formed over the second portion of the interference layer in a predetermined pattern, e.g. spirally or coaxially, for recording information therein. The tracking guide layer is formed over the first portion and the recording layer formed over the second portion of the interference layer for obtaining a tracking signal for use in the tracking servo.

A thickness of the interference layer defined by D minus d is set substantially equal to $(\lambda/4n)+M(\lambda/2n)$ where $\lambda$ is a wavelength of light for reading the information, n is the refractive index of the interference layer, and M is an integer.

In the optical recording media thus structured, the first portion of the interference layer is etched into the predetermined depth, so there is a difference in an optical path length between the first and second portions of the interference layer. By utilizing the difference in the optical path length, the tracking servo can be effected by way of a push-pull method. Therefore, even if the thickness of the interference layer were so set as to maximize the Kerr effect enhancement, the level of a push-pull signal can be prevented from being lowered as can be seen from the graph shown in FIG. 3.

In accordance with still another aspect of the invention, there is provided an optical recording medium including a substrate having a first portion etched into a predetermined depth (d) and a second portion, and a tracking guide layer formed on the second portion of the substrate in a predetermined pattern, e.g. spirally or coaxially, for obtaining a tracking signal for use in tracking servo. An interference layer is formed over the first portion and the tracking guide layer is formed over the second portion of the substrate. The interference layer is made of a light transmissive material having a predetermined thickness (D) above the first portion of the substrate, and the refractive index of the interference layer is higher than that of the substrate for causing multiple reflections of light to occur to thereby yield an interference effect. A recording layer is formed over the interference layer for recording information therein.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
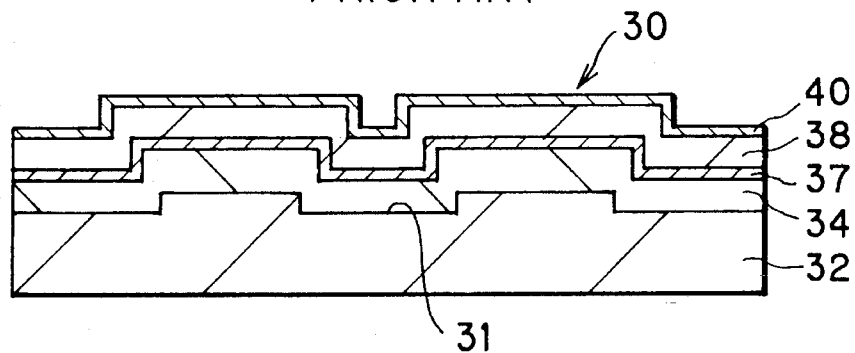
FIG. 1 is a cross-sectional view showing a conventional optical recording medium.
Figure 2:
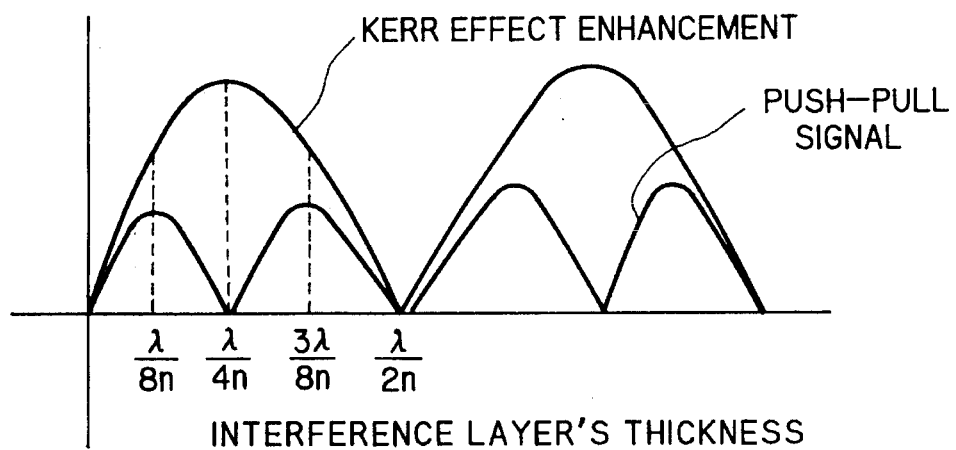
FIG. 2 is a graphical representation showing a Kerr effect enhancement amount and a push-pull signal level in relation to a thickness of an interference layer.

Preferred embodiments of the invention will now be described with reference to FIGS. 4 through 9 wherein the same layers constituting the optical recording medium are denoted by the same reference numerals and are formed or deposited in the same fashion unless described specifically.

Figure 4:
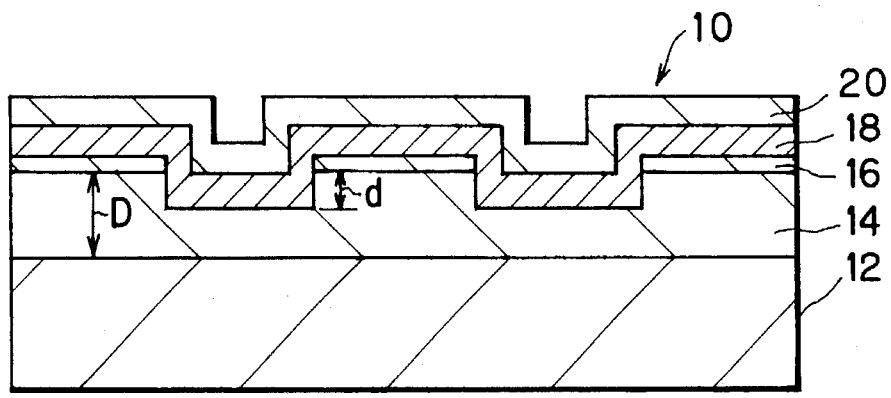
FIG. 4 is a cross-sectional view showing an optical recording medium according to a first embodiment of the invention.

Referring first to FIG. 4, there is shown an optical recording medium, generally denoted by reference numeral 10, according to a first embodiment of the invention. The recording medium 10 is made up of a transparent substrate 12, an interference layer 14, a tracking guide layer 16, a recording layer 18, and a protective layer 20. These layers are successively formed one above the other in the stated order to form a multi-layer unit.

Preferably, the substrate 12 is made of glass but may be made of other materials such as an acrylic resin, polycarbonate resin, or amorphous polyolefin resin.

The interference layer 14 has a first portion etched into a predetermined depth (d) and a second portion having a predetermined thickness (D). The interference layer 14 is formed by way of sputtering or sol/gel film forming method using rotary coating and sintering. The thickness of the interference layer 14, defined by D minus d, is set substantially equal to $(\lambda/4n)+M(\lambda/2n)$ where $\lambda$ a wavelength of reproducing light, n a refractive index of the interference layer, and M an integer. The interference layer 14 is selected from such materials that are light transmissive and have a refractive index larger than the substrate. Such materials are, for example, SiAlON and $TiO_2$. The refractive indices n of SiAlON and $TiO_2$ are 2.2 and 2.7, respectively. In each case, the refractive index n of the interference layer is larger than that of glass (about 1.5) which is the material of the substrate. The interference layer is provided for causing multiple reflections to occur to thereby yield an interference effect.

The tracking guide layer 16 is made of either a metal such as Al (Aluminum), Ta (Tantalum) or a nitride such as TiN. The layer 16 is formed in a predetermined pattern, e.g. spirally or coaxially over the second portion of the interference layer 14. The tracking guide layer 16 is formed by way of photolithography as is well known in the art. Specifically, a metal film of aluminum or Tantalum is formed over the interference layer 14 by vacuum evaporation or sputtering and a resist is uniformly coated over the metal film by spin coating. Thereafter, the resist is partially removed by a laser exposure so that the resist remains in spiral or coaxial configuration. The metal film exposed portion where the resist is removed is etched with acid or alkali aqueous solution or plasma. The interference layer 14 is further etched to a depth of substantially $(\lambda/8n)+L(\lambda/4n)$ with an HF solution or plasma where L is an integer. Finally, the remaining resist is removed using an organic solvent, whereby the tracking guide layer 16 is formed over the non-etched portion or the second portion of the interference layer 14. The etched portion of the interference layer 14 may be formed by using a pattern of the tracking guide layer 16 as a mask without using the resist.

The recording layer 18 is made of a magneto-optic substance which is an amorphous alloy containing a rare earth group substance and a transition metal as major components, such as TbFeCo (Terbium-Iron-Cobalt alloy) and is formed by sputtering or vacuum evaporation. The recording layer 18 may be of a perforation type made of Te or Bi. Alternatively, a phase changing material may be used for the recording layer 18, such as TeOx. The protective layer 20 is provided for protecting the recording layer 18 from a chemical change. The layer 20 is made of SiAiON or AlN and is formed by sputtering or vacuum evaporation.

When the optical recording medium 10 thus formed is irradiated with a laser through the substrate 12, a magnetooptic effect changes the Kerr angle of the reflected light depending on the local magnetization direction of the recording layer 18 and information recorded therein is read based on the Kerr rotation angle of the reflection light. To write the information, the recording layer 18 is locally heated to the Curie point or a compensation temperature by the irradiation of a laser, and the direction of an external magnetic field is appropriately changed at the time of cooling the local portion, whereby information can be recorded corresponding to the magnetization direction.

The optical recording medium as described above has the interference layer made of a light transmissive material having a high refractive index so that multiple reflections occur at a portion between the substrate 12 and the recording layer 18. A phase change amount A for the thickness D of the interference layer 14 is given by equation (1) below and the Kerr effect enhancement becomes a maximum when $A=\pi+2M\pi$ (M being an integer). From equation (1), when $(D-d)=\lambda/4n+M\lambda/2n$, $A=\pi+2M\pi$. Therefore, when D−d is so set, the Kerr effect enhancement in the recording layer becomes a maximum and further the signal-to-noise ratio can be improved.

$$A=(2\pi/\lambda)*n*(D-n)*2 \tag{1}$$

Figure 3:
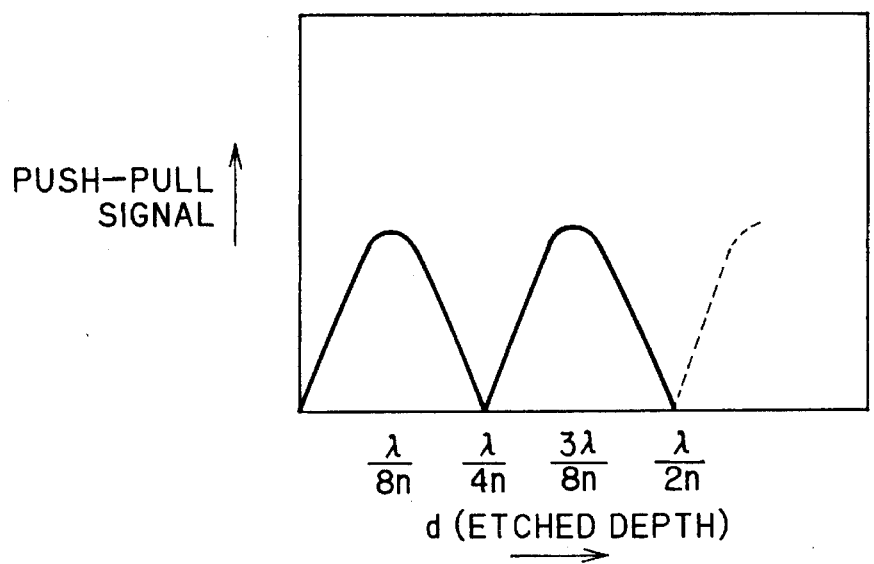
FIG. 3 is a graphical representation showing a relation between a tracking push-pull signal and a phase difference.

The level of the push-pull signal used for tracking servo a becomes maximum when the phase difference B between the tracking guide layer existing and non-existing portions is equal to $(\pi/2)+L\pi$ (L being an integer). On the other hand, the level of the push-pull signal is zeroed when $B=\pi+L\pi$. FIG. 3 is a graph showing the relationship between the level of the push-pull signal and the phase difference. The phase difference B is given by equation (2). The Kerr effect enhancement becomes a maximum when $A=\pi+2M\pi$ and the level of the tracking signal becomes a maximum when $B=(\pi/2)+L\pi$. The etched depth d of the interference layer 14 complying with the above two conditions is given by $(\lambda/8n)+L(\lambda/4n)$. Meanwhile, $d=(\lambda/4n)+L(\lambda/4n)$ when the Kerr effect enhancement is at the maximum and the tracking signal is at a zero level, i.e., when $B=\pi+L\pi$.

$$B=(2\pi/\lambda)*n*d*2 \qquad (2)$$

where $\lambda$ is a wavelength of a reproducing light in a vacuum.

According to the optical recording medium of the first embodiment, by etching the interference layer 14 to a depth substantially equal to $(\lambda/8n)+L(\lambda/4n)$, the Kerr effect enhancement becomes a maximum and at the same time the level of the push-pull signal can be prevented from lowering, whereby a stable tracking servo is ensured. When the etched depth d is at a level around $(\lambda/4n)+L(\lambda/4n)$, the level of the push-pull signal is considerably lowered and implementation of the tracking servo starts becoming untenable. When $d=(\lambda/4n)+L(\lambda/4n)$, the push-pull signal is zeroed and at this time the tracking servo cannot be implemented at all. However, when $d=(\lambda/6n)+L(\lambda/4n)$, while there is a little lowering of the level of the push-pull signal, the tracking servo can be implemented. To summarize, an allowable range of the etched depth d is between $(\lambda/6n)+L(\lambda/4n)$ and $(\lambda/8n)+L(\lambda/4n)$.

As described, the invention provides a high quality optical recording medium wherein the signal-to-noise ratio is improved while maintaining the maximum Kerr effect enhancement. Thus the stable tracking capability can be achieved. Further, an allowable range of the thickness of the interference layer can be widened and therefore the layer thickness need not be formed as accurately as before.

Figure 5:
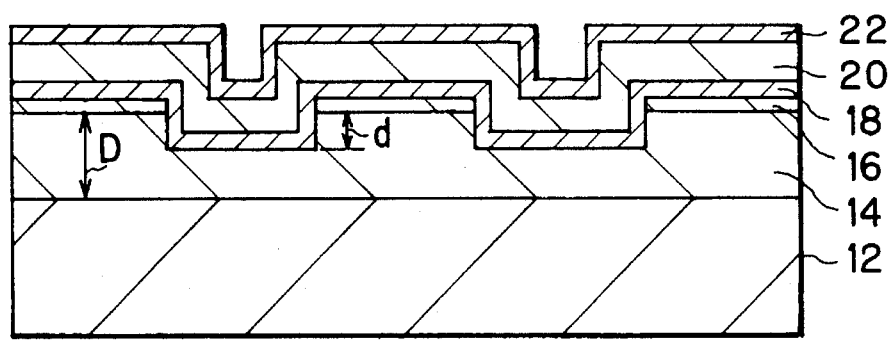
FIG. 5 is a cross-sectional view showing a modification of the optical recording medium shown in FIG. 4.

A modification of the first embodiment is shown in FIG. 5 wherein the thickness of the recording layer 18 is made thinner than that shown in FIG. 4 and a reflection layer 22 is deposited over the protective layer 20. In such a structure, the light incident on the optical recording medium 10 from the substrate 12 passes through the magnetic thin film, that is, the recording layer 18, is reflected from the reflection layer 22, and again passes through the magnetic thin film, that is, the recording layer 18, on its back way, whereby a greater amount of the Kerr effect enhancement can be obtained owing to not only the Kerr effect but also the Faraday effect. In this modification, the reflection of light from the tracking guide layer 16 can be prevented from being lowered and a stabilized tracking capability is assured.

A second embodiment of the invention will be described with reference to FIG. 6.

The optical recording medium 10 of the second embodiment is made up of a substrate 12, an interference layer 14, a recording layer 18, a tracking guide layer 16 and a protective layer 20. These layers are formed one above the other in the stated order. The second embodiment differs from the first embodiment shown in FIG. 4 in that the recording layer 18 and the tracking guide layer 16 of the second embodiment are formed in the place of the tracking guide layer 16 and the recording layer 18 of the first embodiment, respectively. The recording layer 18 of the second embodiment is formed in the same manner as the tracking guide layer 16 of the first embodiment. Similarly, the tracking guide layer 16 of the second embodiment is formed in the same manner as the recording layer 18 of the first embodiment. The materials usable for each layer remain the same.

Figure 6:
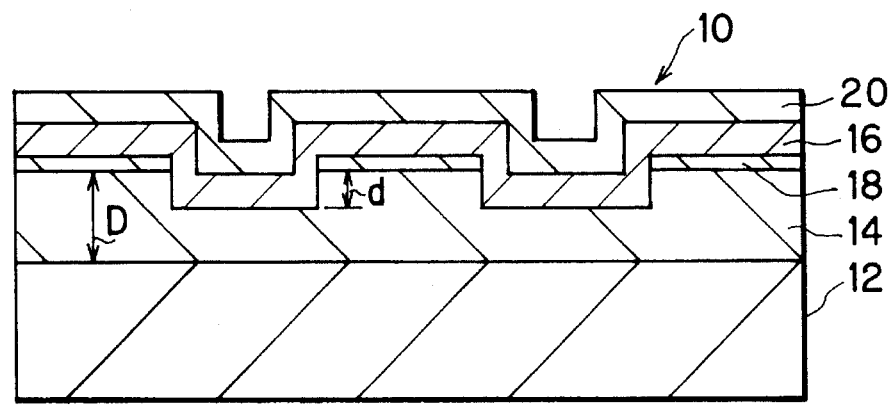
FIG. 6 is a cross-sectional view showing an optical recording medium according to a second embodiment of the invention.
Figure 7:
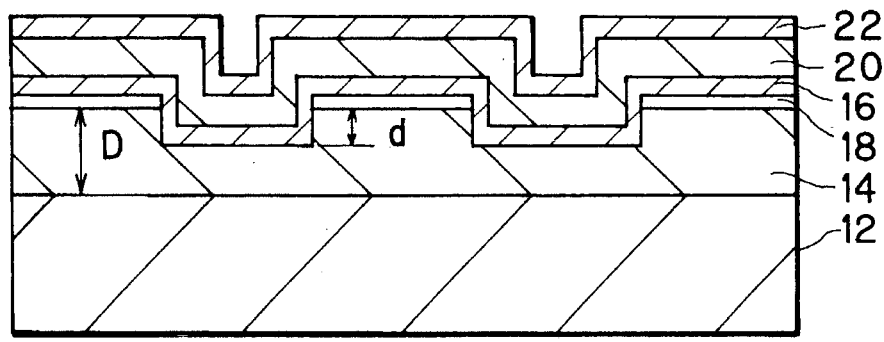
FIG. 7 is a cross-sectional view showing a modification of the optical recording medium shown in FIG. 6.

A modification of the second embodiment is shown in FIG. 7 wherein the thicknesses of both the recording layer 18 and the tracking guide layer 16 are made thinner than those in the second embodiment shown in FIG. 6 and a reflection layer 22 is deposited over the protective layer 20.

Figure 8:
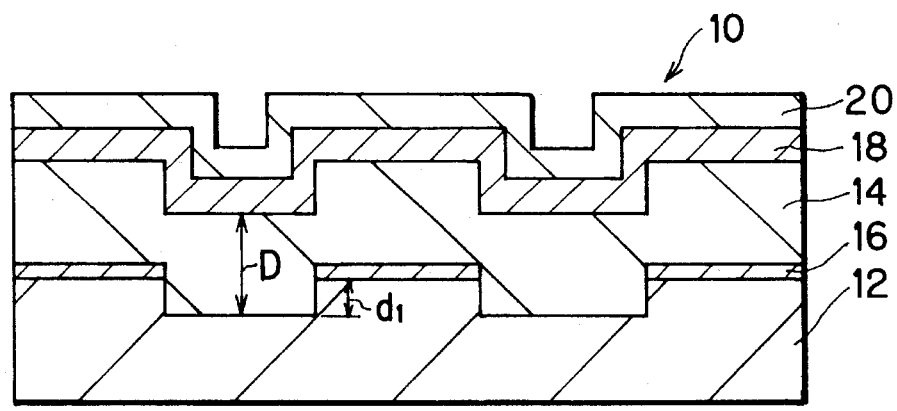
FIG. 8 is a cross-sectional view showing an optical recording medium according to a third embodiment of the invention.
Figure 9:
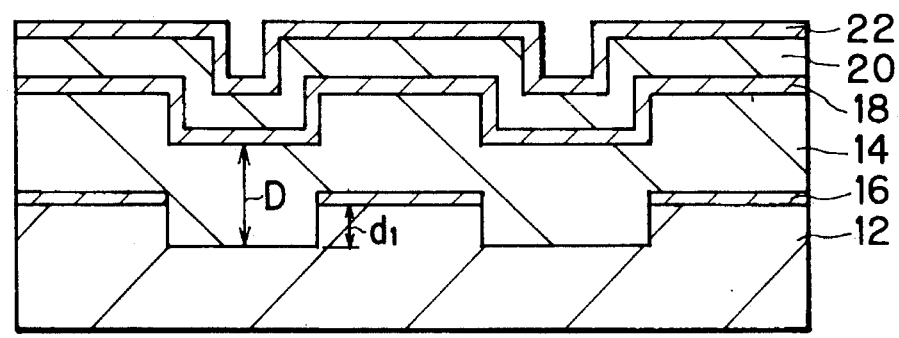
FIG. 9 is a cross-sectional view showing a modification of the optical recording medium shown in FIG. 8.

A third embodiment of the present invention will be described with reference to FIG. 8.

The optical recording medium 10 of the third embodiment is made up of a substrate 12, a tracking guide layer 16, an interference layer 14, a recording layer 18, and a protective layer 20. These layers are formed one above the other in the stated order. The tracking guide layer 16 is formed in a predetermined pattern, e.g. spirally or coaxially over the substrate 12. The tracking guide layer 16 is formed in the same manner as described in connection with the first embodiment. In the process of forming the tracking guide layer 16, the substrate 12 is etched into a depth of substantially $(\lambda/8n_1)+L(\lambda/4n_1)$ where $n_1$ is a refractive index of the substrate and L is an integer.

Thereafter, the interference layer 14 is formed in the same manner as described in connection with the first embodiment. The thickness D of the interference layer 14 is set substantially to $(\lambda/4n_2)+M(\lambda/2n_2)$ where $\lambda$ is a wavelength of reproducing light, $n_2$ a refractive index of the interference layer, and M an integer.

The optical recording medium as described above has the interference layer 1 made of a light transmissive material having a high refractive index so that multiple reflections occur at a portion between the substrate 12 and the recording layer 18. Representing a phase change amount in the interference layer 14 with A and the thickness of the interference layer 14 with D, equation (1') is established and the Kerr effect enhancement becomes maximum when $A=\pi+2M\pi$ (M being an integer). From equation (1'), when $D=\lambda/4n_2+M\lambda/2n_2$, $A=\pi+2M\pi$. Therefore, when this condition is met, the Kerr effect enhancement in the recording layer becomes a maximum, yet improving the signal-to-noise ratio.

$$A=(2\pi/\lambda)*n_2*D*2 \qquad (1')$$

On the other hand, the level of the push-pull signal used for tracking servo becomes a maximum when A−B (B being a phase change amount corresponding to the etched depth $d_1$ of the substrate 12) is equal to $(\pi/2)+N\pi$ (N being an integer). On the other hand, the level of the push-pull signal is zeroed when A−B is equal to $\pi+N\pi$. The phase change amount B is given by equation (2').

$$B=(2\pi/\lambda)*n_1*d_1*2 \qquad (2')$$

where $\lambda$ is a wavelength of a reproducing light in a vacuum. When $A=\pi+2M\pi$ at which the Kerr effect enhancement becomes a maximum and when $A-B=(\pi/2)+N\pi$ at which the level of the tracking signal becomes a maximum, $d_1=(\lambda/8n_1)+L(\lambda/4n_1)$ where L is an integer and is equal to $2m-N\pi$. Meanwhile, $d_1=(\lambda/4n_1)+L(\lambda/4n_1)$ when the Kerr effect enhancement is at the maximum and the tracking signal is at a zero level, i.e., when $A-B=\pi+N\pi$.

According to the optical recording medium of the third embodiment, by etching the substrate 12 into a depth substantially equal to $(\lambda/8n_1)+L(\lambda/4n_1)$, the Kerr effect enhancement becomes maximum and at the same time the level of the push-pull signal is not lowered, whereby a stable tracking servo is ensured. When the etched depth $d_1$ is at a level around $(\lambda/4n_1)+L(\lambda/4n_1)$, the level of the push-pull signal is considerably lowered and implementation of the tracking servo starts becoming untenable. When $d_1=(\lambda/4n_1)+L(\lambda/4n_1)$, the push-pull signal is zeroed and at this time the tracking servo cannot be implemented at all. However, when $d_1=(\lambda/6n_1)+L(\lambda/4n_1)$, while there is a little lowering of the level of the push-pull signal, the tracking servo can be implemented.

Although the invention has been described with respect to specific embodiments, it will be appreciated by one skilled in the art that a variety of changes and modifications may be made without departing from the scope of the invention. Certain features may be used independently of others and equivalents may be substituted all within the spirit and scope of the invention. For example, the tracking control of the disk can be implemented not only by a push-pull method but also a so-called three-beam method.

What is claimed is:

1. An optical recording medium comprising:

a substrate having a first surface and a continuous second surface, said substrate being of a first refractive index;

an interference layer made of a light transmissive material and having first and second surfaces, the first surface of said interference layer being a continuous surface formed entirely over the second surface of said substrate, the second surface of said interference layer having a first portion etched into a predetermined depth and a second portion having a predetermined thickness, said interference layer being of a second refractive index higher than the first refractive index, for causing multiple reflections of light to occur to thereby yield an interference effect;

a tracking guide layer formed over the second surface of said interference layer in a predetermined pattern, for obtaining a tracking signal for use in tracking servo; and a recording layer formed at least over the second portion on the second surface of said interference layer for recording information therein.

2. The optical recording medium according to claim 1, wherein representing the predetermined depth of the first portion of said interference layer with d and the predetermined thickness of the second portion of said interference layer with D, a thickness of said interference layer defined by D minus d is set substantially equal to $(\lambda/4n)+M(\lambda/2n)$ where $\lambda$ is a wavelength of light for reading the information, n is the second refractive index, and M is an integer.

3. The optical recording medium according to claim 2, wherein d is set in a range of between $(\lambda/6n)+L(\lambda/4n)$ and $(\lambda/8n)+L(\lambda/4n)$ where L is an integer.

4. The optical recording medium according to claim 3, wherein said tracking guide layer is formed spirally or coaxially on the first portions on the second surface of said interference layer.

5. The optical recording medium according to claim 4, wherein the spiral formation of said tracking guide layer is continuous.

6. The optical recording medium according to claim 4, wherein the coaxial formation of said tracking guide layer is discontinuous.

7. The optical recording medium according to claim 1, further comprising a protective layer formed over said recording layer for protecting said recording layer.

8. The optical recording medium according to claim 7, further comprising a reflective layer formed over said protective layer for reflecting a light entered interiorly of the optical recording medium from the first surface of said substrate.

9. An optical recording medium comprising:

a substrate having a first surface and a continuous second surface, said substrate being of a first refractive index;

an interference layer made of a light transmissive material and having first and second surfaces, the first surface of said interference layer being a continuous surface formed entirely over the second surface of said substrate, the second surface of said interference layer having a first portion etched into a predetermined depth and a second portion having a predetermined thickness, said interference layer being of a second refractive index higher than the first refractive index, for causing multiple reflections of light to occur to thereby yield an interference effect;

a recording layer formed on the second portion on the second surface of said interference layer in a predetermined pattern for recording information therein; and a tracking guide layer formed at least over the first portion on the second surface of said interference layer, for obtaining a tracking signal for use in tracking servo.

10. The optical recording medium according to claim 9, wherein representing the predetermined depth of the first portion of said interference layer with d and the predetermined thickness of the second portion of said interference layer with D, a thickness of said interference layer defined by D minus d is set substantially equal to $(\lambda/4n)+M(\lambda/2n)$ where $\lambda$ is a wavelength of light for reading the information, n is the second refractive index, and M is an integer.

11. The optical recording medium according to claim 10, wherein d is set in a range of between $(\lambda/6n)+L(\lambda/4n)$ and $(\lambda/8n)+L(\lambda/4n)$ where L is an integer.

12. The optical recording medium according to claim 11, wherein said recording layer is formed spirally or coaxially on the first portions on the second surface of said interference layer.

13. The optical recording medium according to claim 12, wherein the spiral formation of said recording layer is continuous.

14. The optical recording medium according to claim 12, wherein the coaxial formation of said recording layer is discontinuous.

15. The optical recording medium according to claim 9, further comprising a protective layer formed over said tracking guide layer for protecting said tracking guide layer.

16. The optical recording medium according to claim 5, further comprising a reflective layer formed over said protective layer for reflecting a light entered interiorly of the optical recording medium from the first surface of said substrate.

* * * * *